US011858656B2

(12) United States Patent
Vana et al.

(10) Patent No.: US 11,858,656 B2
(45) Date of Patent: Jan. 2, 2024

(54) AIRPORT PARKING SYSTEM FOR ELECTRIC TAXI DRIVEN AIRCRAFT

(71) Applicant: Borealis Technical Limited, North Plains, OR (US)

(72) Inventors: Jan Vana, Prague (CZ); Isaiah W. Cox, London (GB); Joseph J. Cox, North Plains, OR (US)

(73) Assignee: BOREALIS TECHNICAL LIMITED, Isle of Man (IM)

( * ) Notice: Subject to any disclaimer, the term of this patent is extended or adjusted under 35 U.S.C. 154(b) by 352 days.

(21) Appl. No.: 17/091,864

(22) Filed: Nov. 6, 2020

(65) Prior Publication Data

US 2021/0139165 A1    May 13, 2021

Related U.S. Application Data

(60) Provisional application No. 62/933,041, filed on Nov. 8, 2019.

(51) Int. Cl.
| | |
|---|---|
| *B64F 1/00* | (2006.01) |
| *B64C 25/32* | (2006.01) |
| *B64D 47/08* | (2006.01) |
| *B64F 1/305* | (2006.01) |

(52) U.S. Cl.
CPC ............ *B64F 1/002* (2013.01); *B64C 25/405* (2013.01); *B64D 47/08* (2013.01); *B64F 1/305* (2013.01)

(58) Field of Classification Search
CPC ......... B64C 25/405; B64F 1/002; B64F 1/305
See application file for complete search history.

(56) References Cited

U.S. PATENT DOCUMENTS

| | | | |
|---|---|---|---|
| 9,284,065 B2 | 3/2016 | Millgard | |
| 9,771,148 B2 | 9/2017 | Cox et al. | |
| 10,308,352 B2 | 6/2019 | Cookman et al. | |
| 2007/0040063 A1* | 2/2007 | McCoskey | ............... B64F 1/36 244/114 R |

(Continued)

FOREIGN PATENT DOCUMENTS

| | | |
|---|---|---|
| DE | WO1999/018555 A1 | 4/1999 |
| EP | 3079136 A1 | 12/2016 |

(Continued)

*Primary Examiner* — Timothy D Collins
*Assistant Examiner* — Eric Acosta

(57) ABSTRACT

A system is provided that guides aircraft driven with landing gear wheel-mounted electric taxi drive systems without reliance on airport ground personnel to park the aircraft parallel to an airport terminal with connections to multiple passenger loading bridges, automatically docks the aircraft, and connects the multiple loading bridges to multiple forward and rear doors. Cooperative on-aircraft monitoring systems, airport docking systems, loading bridge and terminal monitoring systems, and processors are integrated to use real time information and guide the aircraft to safely maneuver into and automatically dock in a parallel orientation at a parking location with multiple aircraft forward and rear doors connected to multiple loading bridges. The system may automatically undock the aircraft and retract the loading bridges and guide the electric taxi drive system-driven aircraft out of the parking location without reliance on airport ground personnel.

15 Claims, 5 Drawing Sheets

(56) References Cited

U.S. PATENT DOCUMENTS

| | | | |
|---|---|---|---|
| 2007/0214584 A1* | 9/2007 | Hutton | B64F 1/3055 14/71.5 |
| 2007/0214585 A1 | 9/2007 | Hutton et al. | |
| 2015/0008286 A1* | 1/2015 | Cox | B64F 1/305 414/800 |
| 2015/0142214 A1 | 5/2015 | Cox et al. | |
| 2015/0151834 A1 | 6/2015 | Cox et al. | |
| 2016/0351061 A1* | 12/2016 | Lamkin | G08G 5/0021 |
| 2020/0027363 A1 | 1/2020 | Vana et al. | |

FOREIGN PATENT DOCUMENTS

| | | |
|---|---|---|
| GB | 2530964 A | 4/2016 |
| GB | 2568356 A | 5/2019 |

* cited by examiner

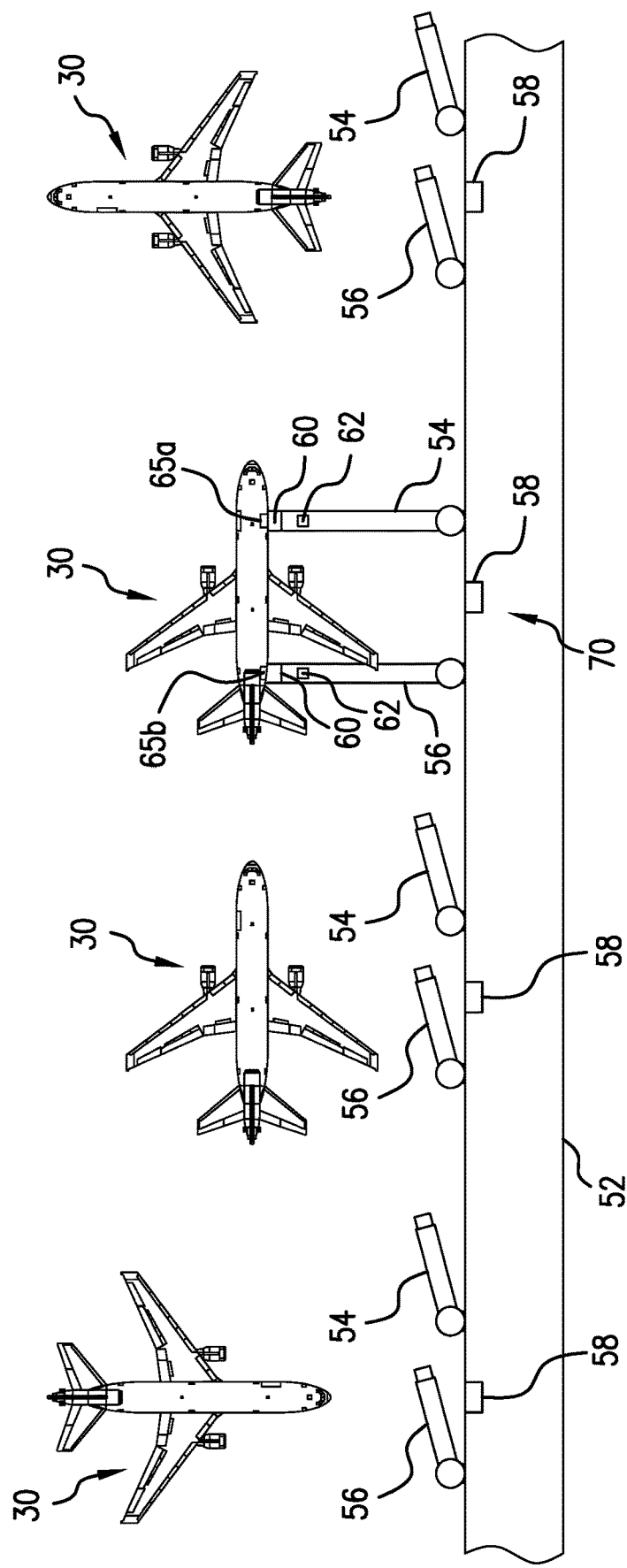

AIRPORT PARKING SYSTEM FOR ELECTRIC TAXI DRIVEN AIRCRAFT

PRIORITY CLAIM

This application claims priority from U.S. Provisional Patent Application No. 62/933,041, filed 8 Nov. 2019, the entire disclosure of which is fully incorporated herein in its entirety.

TECHNICAL FIELD

The present invention relates generally to systems for parking aircraft at airport terminals and specifically to a system for parking an aircraft driven by an electric taxi drive system in a parallel orientation to an airport terminal building.

BACKGROUND OF THE INVENTION

Increasing the safety and efficiency with which airport ramp and gate operations can be conducted to move arriving and departing aircraft, passengers, and cargo continues to be a goal of airports and airlines. Inefficiencies and delays can have both local and widespread undesirable effects for passengers, airlines, and airports. Ramp areas and gates at today's airport terminals can be very congested places with multiple aircraft simultaneously arriving and departing, ground-based service vehicles and personnel servicing parked aircraft, and ground crews directing the arriving and departing aircraft into and out of gates and stands. The safe movement of aircraft to avoid collisions and other adverse incidents requires careful monitoring and control of the locations and movements of both arriving and departing aircraft as they are maneuvered within the ramps and into parking locations at airport terminal buildings. Ground crews currently guide moving aircraft, largely because the pilot and flight crew are not able to see the entire ground environment surrounding the aircraft. The use of cameras and sensors mounted on exterior locations on aircraft has been helpful. However, despite the availability of these devices, incidents during ground maneuvers within an airport ramp area still occur all too frequently and may have adverse effects on safety and efficiency of ramp operations.

Aircraft are currently parked at airport stands and gates in a nose-in orientation with the nose end of the aircraft pointed toward the stand or gate so that the longest axis of the aircraft fuselage is substantially perpendicular to an airport terminal building. This parking orientation is used because aircraft currently operate at least one engine to power aircraft ground travel into a ramp area and a parking location. When even one aircraft engine is operating, jet blast and engine ingestion can compromise the safety of persons and ground equipment within an engine hazard area. Safety is more likely to be compromised when an aircraft engine is operating within a ramp area and near a terminal building where there are more aircraft, persons, and equipment in a relatively confined space than outside the ramp area. When all aircraft are parked in the same nose-in orientation at an airport terminal building, the danger areas where engine ingestion or jet blast could occur when aircraft engines are operating are at least somewhat predictable. Airport ramp operations procedures are presently established and conducted for aircraft parked in nose-in orientations. Applicant has determined that parking an aircraft with the longest axis of the aircraft fuselage parallel to a terminal building or ramp parking location instead of the currently used nose-in perpendicular aircraft orientation may actually allow more efficient use of terminal parking space resources and lead to more efficient ramp operations. The present need to use aircraft engines to drive aircraft to stands and gates and the associated risks of jet blast and engine ingestion dangers with operating aircraft engines, however, prohibits the use of this aircraft parallel parking orientation.

Driving an aircraft during ground travel with pilot-controlled landing gear wheel-mounted electric taxi drive systems without reliance on operation of the aircraft's main engines and the use of tow vehicles and tugs has been proposed by Applicant and others. When a pilot controls operation of an electric taxi drive system to maneuver an aircraft without operating aircraft engines and tugs during ground travel, not only are the risks of jet blast and engine ingestion eliminated, but pilot situational awareness and ground operation safety may be increased compared to when aircraft are driven within an airport ramp area by operating engines and moved by attachment to tugs.

Docking systems that automatically check ramp environmental conditions, particularly visibility, and guide identified aircraft into assigned airport gates are available. The available systems, however, are designed to guide the identified aircraft into gates or stands along a defined centerline to park at a stop location in the nose-in orientation where engine ingestion or jet blast are at least somewhat predictable and then to dock the identified aircraft at a single passenger loading bridge at the stop location. Using these systems to guide aircraft to park in any orientation other than nose-in or to dock at or connect to more than one passenger loading bridge has not been suggested. Further, the available docking systems do not automatically undock aircraft from passenger loading bridges or guide the aircraft to move forward out of the parking location and then the ramp area.

A need exists for a system that guides aircraft driven by electric taxi drive systems to park at an airport terminal parking location in an orientation parallel to an airport terminal building with a longest axis of the aircraft parallel to the terminal, that automatically docks the parked aircraft with multiple passenger loading bridges to connect with multiple doors of the aircraft, and then automatically undocks the aircraft from the multiple passenger loading bridges and guides the aircraft to drive in a forward direction away from the parking location and out of the ramp area.

SUMMARY OF THE INVENTION

It is an object of the present invention to provide a system that guides aircraft driven by electric taxi drive systems to park at an airport terminal parking location in an orientation with a longest axis of the aircraft parallel to an airport terminal, that automatically docks the parked aircraft with multiple passenger loading bridges to connect with multiple doors of the aircraft, and then automatically undocks the aircraft from the multiple passenger loading bridges and guides the aircraft to drive in a forward direction away from the parking location and out of the ramp area.

It is another object of the present invention to provide a system that integrates an on-aircraft monitoring system, an airport docking system, and a processing system to guide an aircraft driven by a landing gear wheel-mounted electric taxi system during ground travel in a ramp area to maneuver forward into a parking orientation with a longest axis of the aircraft fuselage parallel to an airport terminal and to automatically dock and connect with at least two extendible passenger loading bridges spaced to connect the airport terminal with at least a front door and a rear door on a terminal facing side of the aircraft.

It is an additional object of the present invention to provide a method for guiding an aircraft driven in a forward direction by landing gear wheel-mounted electric taxi systems during ground travel in an airport ramp area with minimal or no human intervention or control to maneuver into a parking location with the aircraft parallel to an airport terminal, to dock the aircraft with multiple extendible passenger loading bridges spaced to connect the terminal with multiple aircraft doors on a terminal facing side of the aircraft, and to automatically undock the aircraft from the passenger loading bridges and parking location and guide the aircraft driven with the electric taxi drive systems forward out of the parking location.

It is a further object of the present invention to provide a method for providing complete guidance information to guide an aircraft driven by landing gear wheel-mounted electric taxi systems without reliance on airport ground personnel to move toward and into an airport terminal parking location and dock at the parking location with a longest axis of the aircraft oriented perpendicular to the parking location, to automatically extend at least two spaced passenger loading bridges and connect the at least two spaced passenger loading bridges with at least a front door and a rear door on the same side of the aircraft, and to automatically undock the aircraft from the parking location and guide the undocked aircraft forward away from the parking location without reliance on airport ground personnel.

In accordance with the aforesaid objects, a system is provided that guides an aircraft equipped with landing gear wheel-mounted electric taxi drive systems without reliance on airport ground personnel to maneuver into a designated parking location at an airport terminal to park with the longest axis of the aircraft fuselage parallel to the airport terminal and to dock with multiple passenger loading bridges at the designated parking location spaced to connect to multiple doors on a terminal facing side of the aircraft. The system may integrate components of an on-aircraft monitoring system, an airport parking location docking system, and a processing system to guide the aircraft driven by the electric taxi drive system within an airport ramp area without reliance on airport ground personnel to maneuver into and automatically dock at a terminal parking location with the longest axis of the aircraft oriented parallel to the terminal and to automatically connect multiple extendible passenger loading bridges to multiple aircraft doors on the terminal facing side of the aircraft. The processing system integrates real time information from the on-aircraft monitoring system and the airport parking location docking system to guide an arriving aircraft as it is moved in a forward direction with the electric taxi drive system toward the terminal and into a parked position parallel to the terminal at an assigned parking location, to automatically extend the multiple extendible passenger loading bridges, and to dock the parallel parked aircraft with the multiple extendible passenger loading bridges. The system may also operate in reverse to automatically undock a departing aircraft, to retract the multiple passenger loading bridges, and then to guide the aircraft to drive forward with the electric taxi drive system out of the parallel parking location and ramp area.

The present invention additionally provides a method that employs the foregoing system for guiding a landing gear wheel-mounted electric taxi drive system-driven aircraft equipped with an on-aircraft monitoring system, without reliance on airport ground personnel, into a designated parking location in an orientation with the aircraft fuselage longest axis oriented parallel to an airport terminal, and automatically docking the aircraft with multiple passenger loading bridges connected to multiple front and rear doors. The aircraft is driven with the electric taxi drive system in only a forward direction into and out of the designated parking location, and aircraft movements to park in the parallel orientation, automatically dock with the multiple passenger loading bridges, and automatically undock from the multiple passenger loading bridges prior to being driven away from the designated parking location and out of the ramp area in only a forward direction. The forward movement of the electric taxi drive system-driven aircraft may be guided by the processing system with real time information communicated from the on-aircraft monitoring system and the airport docking system.

Additional objects and advantages will be apparent from the following description, claims, and drawings.

BRIEF DESCRIPTION OF THE DRAWINGS

FIG. 3 illustrates one embodiment of the system and method of the present invention at the airport represented in FIG. 1, wherein a single electric taxi drive system-driven aircraft is guided to automatically dock at a designated airport terminal parking location and park parallel to the airport terminal to connect to extendible passenger loading bridges.

DESCRIPTION OF THE INVENTION

Figure 1:
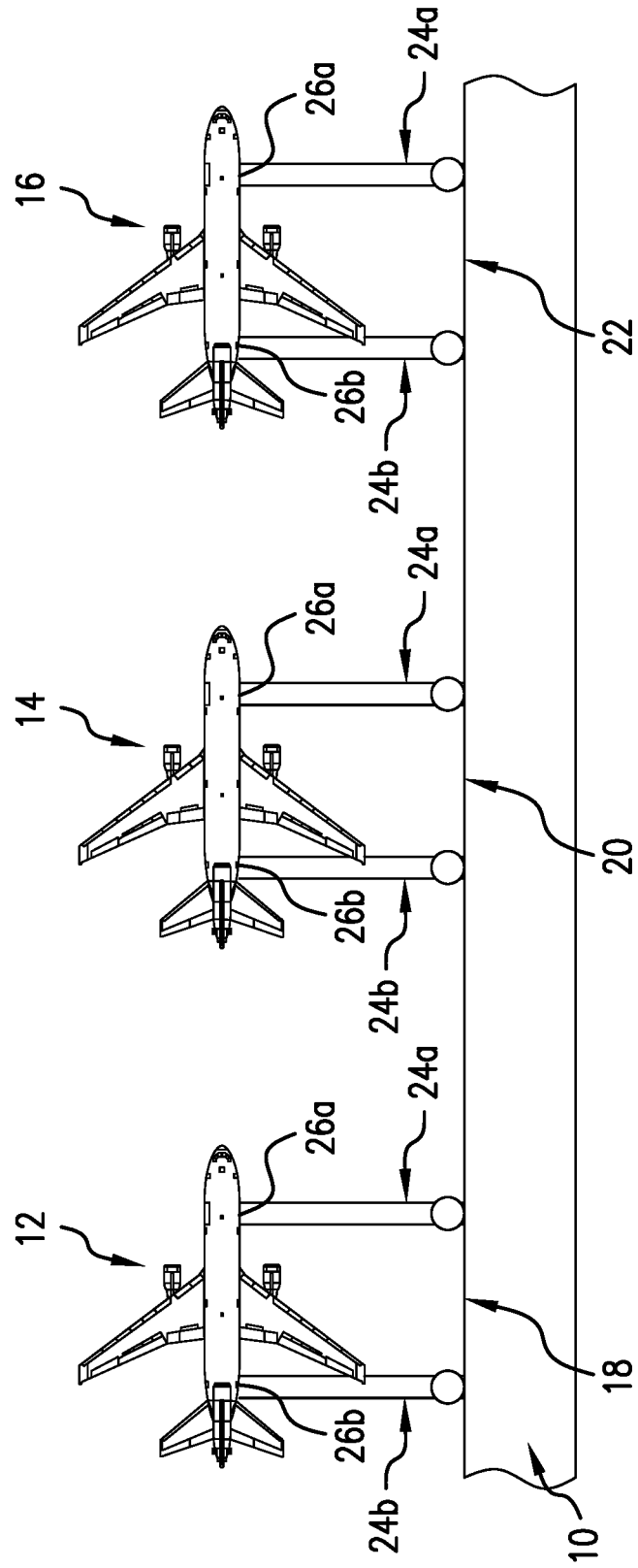
FIG. 1 is a diagrammatic representation of an airport terminal with a plurality of aircraft parking locations where aircraft are parked in an orientation with a longest axis of the fuselage oriented parallel to an airport terminal and multiple extendible passenger loading bridges connect multiple aircraft doors to the airport terminal.

The system and method of the present invention are particularly suitable for use at an airport terminal where an arrangement of extendible passenger loading bridges is configured so that at each aircraft parking location multiple passenger loading bridges are spaced to extend perpendicularly from a terminal building or like aircraft parking structure to connect with multiple aircraft doors. In preferred embodiments, at least a forward and a rear, or aft, door on the same terminal facing side of the aircraft are connected to passenger boarding bridges. Providing the multiple flexibly movable extendible passenger loading bridges at each aircraft parking location facilitates automatic docking and connection to the aircraft upon arrival, as well as undocking and removal from an aircraft's clearance area when the aircraft is ready to drive forward out of a parking location at departure. It is contemplated that the system and method of the present invention may be implemented with only minor modifications to existing airport structures or facilities without the need to renovate or tear down and rebuild these structures.

The present invention is also most effectively implemented when one or more and preferably a plurality, of the aircraft landing, parking, moving on the ground, and taking off from the aforementioned airport terminal are equipped with pilot-controllable landing gear wheel-mounted electric taxi drive systems that move the aircraft during ground travel without reliance on the aircraft's main engines or tow vehicles, as described in more detail below. Electric taxi drive system-equipped aircraft can be driven into an airport ramp to park in any parking orientation, from the traditional nose-in orientation currently used to the orientation parallel to a terminal described herein, without the hazards associated with jet blast or engine ingestion. Electric taxi drive system-equipped aircraft can also maneuver freely into and out of parking locations without external assistance while traveling in only a forward direction. Arriving passengers may depart from an electric taxi drive system-equipped aircraft essentially immediately after the aircraft is guided into a parking location, parked and docked with the multiple passenger loading bridges. When a significant number of aircraft at an airport are equipped with landing gear wheel-mounted electric taxi drive systems and the airport parking system of the present invention is implemented at the airport, ramp operations safety, aircraft traffic flow efficiency, and aircraft turnaround efficiency may be improved.

The terms "ramp" and "ramp area" will be used herein to refer to the area at an airport that is intended to accommodate aircraft for the loading and unloading of passengers, mail, cargo, fueling, parking, or maintenance and is synonymous with the term "apron," which is also used to identify this area at an airport.

The terms "airport terminal" and "terminal" include an airport terminal building and like structures, whether or not attached to a terminal building. The term "parking location" may also include a gate and a stand where aircraft may be parked in a parallel or perpendicular orientation to the terminal as described herein.

"Electric taxi drive systems" and "electric taxi systems," whether used in the plural or singular, refer to pilot-controllable drive systems used to drive aircraft independently of and without reliance on operation of aircraft main engines and external tow vehicles and may include landing gear wheel-mounted electric drive motors, gear or roller traction drive systems, clutches, and other components activatable to power landing gear wheels and drive the aircraft during ground travel in response to pilot control. An example of one electric taxi system developed by Applicant to drive an aircraft during ground travel without reliance on operation of the aircraft's main engines or attachment to external tow vehicles is described in commonly owned U.S. Pat. No. 10,308,352, the disclosure of which is fully incorporated herein in its entirety by reference. Other drive systems using drive motors that are not electric, including, for example, hydraulic or pneumatic drive motors, may also drive aircraft in connection with the automatic aircraft parking system and method of the present invention and are contemplated to be included within the terms "electric taxi drive systems." An electric taxi drive system may be mounted completed within a volume defined by walls of a landing gear wheel in one or more nose or main landing gear wheels. In a preferred embodiment, electric taxi drive systems are mounted completely within defined volumes in both nose landing gear wheels and are controlled by a pilot or flight crew from the aircraft cockpit with controls designed to operate the electric taxi drive system, power the nose landing gear wheels, and drive the aircraft during ground travel without reliance on the aircraft's main engines and external assistance from tow vehicles.

The system and method of the present invention may be employed with aircraft equipped with the foregoing electric taxi drive systems to safely and efficiently move these aircraft into and out of airport parking locations where the aircraft may be parked in an orientation with the longest axis of the aircraft fuselage parallel to the airport terminal at an airport where aircraft parking locations are equipped with multiple extendible passenger loading bridges and docking systems that may dock the aircraft automatically at a parking location so that the multiple extendible passenger loading bridges connect to multiple doors on the terminal facing side of the aircraft. The multiple connections, which preferably include at least one forward aircraft door and at least one rear aircraft door and may include additional forward and rear doors in some types of aircraft, provide increased passenger transfer into and out of the aircraft, whether by simultaneous boarding and deboarding through different forward and rear doors or by passenger egress and then passenger ingress through all forward and rear doors connected to loading bridges. The term "multiple" as used herein to describe numbers of passenger loading bridges and corresponding aircraft forward and rear doors where the passenger loading bridges may dock includes the two passenger loading bridges and the one forward and one rear door on the terminal facing side of the electric taxi drive system-driven aircraft shown and discussed in connection with the drawings. The term "multiple" may also include more than two passenger loading bridges and more than two aircraft doors, as discussed herein, and this term is not intended to be limiting.

Referring to the drawings, which are not drawn to scale, FIG. 1 is a diagrammatic representation of a use of the system and method of the present invention at an airport terminal with a plurality of aircraft parking locations, each with two passenger loading bridges to provide connections between at least a forward and an aft, or rear, door through the two passenger loading bridges of aircraft docked at the parking locations parallel to the airport terminal. As noted, it is contemplated that additional passenger loading bridges may also be provided at each terminal parking location to provide connections between additional forward and rear doors to accommodate aircraft using more than two doors for passenger transfer. FIG. 1 shows an airport terminal 10 with three aircraft 12, 14, and 16, all of which are equipped to be driven during ground travel with landing gear wheel-mounted electric taxi drive systems, parked in three parking locations 18, 20, and 22 at the terminal 10 with the longitudinal nose to tail axis of the aircraft fuselage oriented parallel to the terminal 10. This is also referred to herein as the "longest axis" of the aircraft. Each of the parking locations 18, 20, and 22 provides two passenger loading bridges (24a, 24b) that are preferably the kind of passenger loading bridges that are extendible toward the aircraft and retractable toward the terminal. Passenger transfer efficiency may be improved when at least one forward door and at least one rear door on a terminal-facing side of the aircraft are used for passenger egress and ingress. When aircraft are parked in the parallel orientation shown in FIG. 1 and two extendible passenger loading bridges 24a, 24b are provided for each parking location and may be automatically or manually connected to aircraft doors. The passenger loading bridge 24a may be connected to a forward aircraft door 26a, and the passenger loading bridge 24b may be connected to a rear aircraft door 26b. As noted, the number of extendible passenger loading bridges may depend on the type of aircraft that is parked at the parking location. Many aircraft have a single forward door and a single rear or aft door on each side of the aircraft; other aircraft have multiple forward doors and multiple rear doors. When more than two passenger loading bridges are provided at parking locations, aircraft with more than two forward and rear doors may use these parking locations.

The passenger loading bridges 24a, 24b may be designed to automatically extend toward the aircraft doors and connect with the aircraft doors and then automatically retract away from the aircraft and pivot toward the terminal to minimize the space occupied by the loading bridges when not in use. It will be noted from FIG. 1 that when the passenger loading bridges are extended to connect with the aircraft forward and rear doors of the aircraft 12, 14, and 16 docked at each respective parking location 18, 20, and 22, the loading bridges are aligned parallel to each other and perpendicular to both the terminal 10 and each aircraft. If an airport does not have at least two extendible passenger loading bridges at a single aircraft parking location that may be connected to both a forward and a rear door on an aircraft docking at the parking location, it is contemplated that additional passenger loading bridges may be added to the airport terminal without the significant cost and related issues that accompany most airport infrastructure modifications. Only three aircraft are shown docked at the portion of terminal 10 shown. The number of aircraft that can be parked parallel to a terminal as shown will depend on factors such as the size of the terminal, the numbers of multiple passenger loading bridge arrangements that the terminal can accommodate, and the size of the aircraft to be docked.

Figure 2:
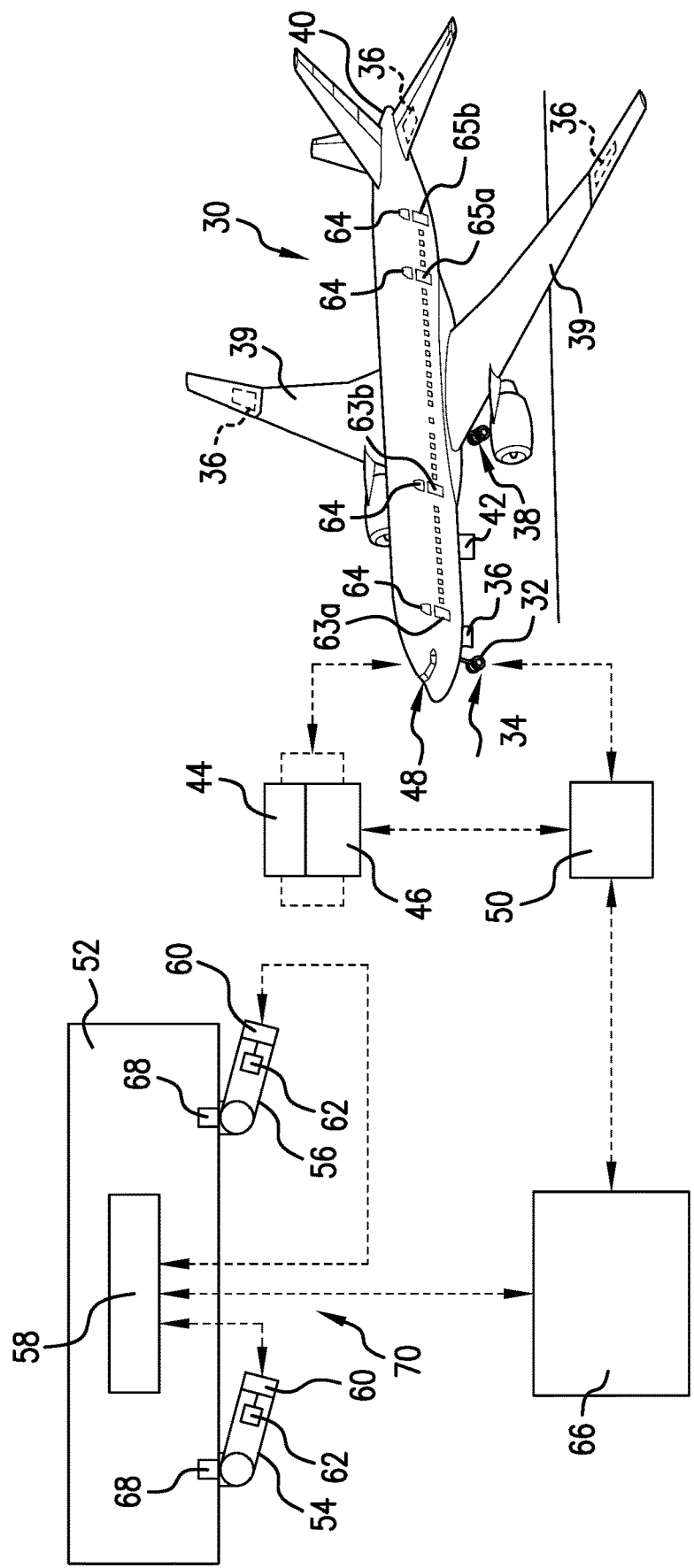
FIG. 2 is a schematic illustration of the integrated the on-aircraft monitoring and electric taxi drive system, the airport terminal docking system, and the processing system of the present invention.

FIG. 2 is a schematic illustration of the integrated the on-aircraft monitoring and electric taxi drive system, the airport terminal docking system, and the processing system of the present invention designed to support guidance of arriving electric taxi drive system-driven aircraft to a terminal parking location, automatic aircraft docking and parking parallel to the terminal, automatic aircraft undocking, and guidance of departing aircraft out of the parking location, without reliance on airport ground personnel. Guidance without reliance on airport ground personnel is controlled by an on-aircraft monitoring system with a range of different monitoring and sensing devices that assist a pilot driving an aircraft equipped with landing gear wheel-mounted electric taxi drive systems to maneuver the aircraft with the electric taxi drive systems during ground travel, particularly in an airport ramp area, with minimal or no human intervention or control. For example, aircraft 30 in FIG. 2, which is equipped with electric taxi drive systems 32 mounted completely within defined volumes in each wheel of the nose landing gear 34, may have one or more cameras 36 mounted aerodynamically in locations on the exterior of aircraft 30 that may include near the nose landing gear wheels 34, near the main landing gear 38, on aircraft wings 39, near the aircraft tail 40, and in other locations selected to provide information that may affect aircraft ground travel. Sensors, including proximity and other sensors (not shown), may be mounted in locations with cameras and in locations without cameras. At least one scanning LiDAR device 42 may be mounted in a location on the aircraft's fuselage that provides a panoramic 360-degree view of the aircraft exterior ground environment. The locations shown and numbers of the cameras, sensors, and scanning LiDAR device are illustrative, and other on-aircraft locations that may be used to guide the electric taxi drive system-driven aircraft within an airport ramp area to automatically dock and undock from a parallel parking orientation as described herein are also contemplated to be within the scope of the present invention. Separate electric taxi drive system sensors (not shown), as described in U.S. Pat. No. 10,308,352 incorporated herein by reference above, may also be included to monitor selected electric taxi drive system parameters as the aircraft is driven into and out of the parallel parking locations with the electric taxi drive system without reliance on airport ground personnel.

Controls 44 for the electric taxi drive systems 32 and indicators and displays 46 for the cameras, scanning LiDAR device, and other monitoring and sensing devices may be added to the cockpit 48, where they are accessible to the aircraft pilot and flight crew. An on-aircraft processor 50, which may be programmed to receive real time information from the various monitoring and sensing devices, the electric taxi drive systems 32, and the electric taxi drive system sensors, integrates this information and communicates it to the cockpit. The processor 50 is schematically shown to be separate from the aircraft 30 in FIG. 2, but will preferably be positioned in a convenient location on the aircraft. The electric taxi drive systems 32 may be programmed to operate automatically and may be operated manually to drive the aircraft in response to the integrated information communicated to the cockpit from the monitoring and sensing devices. Software with intelligent algorithms operative to integrate operation of the electric taxi drive systems, the on-aircraft processor, and the docking system may be provided to program the processor 50 for automatic real time operation of the on-aircraft monitoring system. The intelligent algorithms may also be operative to guide ground travel of the electric taxi drive system-driven aircraft in response to real time information from the on-aircraft monitoring system and to control docking of an identified aircraft at an assigned parking location in response to real time information from at least a parking location receiving device, loading bridge receiving and transmitting devices, and aircraft door receiving and transmitting devices. Artificial intelligence may additionally be incorporated into the guidance of the aircraft monitored by the on-aircraft monitoring system and driven with the electric taxi drive systems, as well as guidance for the automatic docking and undocking of the aircraft at a parking location. The on-aircraft processor 50 is configured to communicate in real time with electric taxi drive systems 32, with the on-aircraft monitoring system, and the cockpit controls 44 and indicators 46 as the electric taxi drive system-driven aircraft is guided to a parking location without reliance on airport ground personnel. The on-aircraft processor 50 also communicates in real time with a terminal docking and parking system processor 66, as shown by the dashed lines in FIG. 2.

FIG. 2 additionally illustrates elements of the airport docking system that may be integrated with the operation of the aircraft electric taxi drive system and on-aircraft monitoring system as the aircraft 30 is guided to automatically dock and park in an orientation parallel to the terminal 52 at the parking location shown and to connect with the passenger loading bridges 54 and 56 in the perpendicular and parallel loading bridge orientation shown in FIG. 1. An airport docking system preferred for use in the present invention may include at least one receiver, represented at 58, to receive real time information from the aircraft 30 at each parking location. This information may relate to the aircraft's identity and position relative to the terminal and may also include other information important for docking the aircraft and connecting specific aircraft forward and rear doors to the passenger loading bridges 54 and 56. A transmitter 60 may be positioned on an aircraft docking end of each loading bridge (54, 56) to assist in docking each loading bridge to a specific forward or rear aircraft door on the aircraft 30. Each passenger loading bridge (54, 56) may also be equipped with additional sensors and receivers 62 that communicate with and receive information from corresponding sensors, transmitters, and receivers 64 positioned at aircraft front and rear doors, preferably at each front and rear door to be connected to a passenger loading bridge. Since aircraft may approach a terminal from a starboard or a port side, sensors, transmitters, and receivers 64 may be positioned at front and rear doors on both sides of the aircraft. The sensors, transmitters, and receivers 64 shown in FIG. 2 are not on a terminal facing side of aircraft 30 and are not needed for docking and connection of the aircraft 30 to the loading bridges 54 and 56 at the terminal 52. There are corresponding sensors, transmitters, and receivers 64 (not shown) positioned at corresponding forward and rear doors on the opposite side of the aircraft 30, which are needed to park the aircraft.

The aircraft 30 has two doors forward of the wings 39 and two doors rear of the wings 39 on each side of the aircraft; as noted, only one side of the aircraft is visible in FIG. 2. The opposite side of the aircraft 30 has a corresponding arrangement of forward and rear doors. Sensors, transmitters, and receivers 64 are shown at both forward doors 63a and 63b and both rear doors 65a and 65b. This permits the use of passenger loading bridges with varied spacing and may provide more flexibility in docking the aircraft. Other aircraft may have different numbers and spacing arrangements of forward and rear doors on each side of the aircraft. The spacing of the loading bridges at the airport terminal may determine which forward door and which rear door will connect to a loading bridge when the aircraft is docked in the parking location.

It is contemplated that the multiple passenger loading bridges at a parking location referred to above may be more than two passenger loading bridges, and the aircraft to be docked may have only two doors to be connected to loading bridges. Integrating the real time information from the loading bridge transmitters 60 and receivers 62 and the aircraft front door and rear door transmitters, sensors, and receivers 64 with the docking system may ensure that only two loading bridges with the correct spacing are automatically extended to be connected to the aircraft's two forward and rear doors.

A processor 66 and software, which preferably includes intelligent algorithms, are provided to process received and transmitted information from the receivers 58 and 60 and the transmitters 62 and also to process and integrate information transmitted from the on-aircraft processor 50 in real time. Information required to guide the aircraft 30 into its parking location to automatically dock with the terminal and connect to the passenger loading bridges may additionally be transmitted from the docking system processor 60 to the on-aircraft processor 50.

An automatic controller 68 for automatically extending and retracting the passenger loading bridges may be provided for each loading bridge 54, 56. The automatic controller 68 will preferably be in communication with the processor 66 to control automatic extension and retraction of the passenger loading bridges as the aircraft 30 is being docked and undocked from loading bridges 54, 56 and the terminal 52.

The aircraft are, optimally, automatically guided by the on-aircraft monitoring systems to be driven in only a forward direction into and out of parking locations with the electric taxi drive systems without reliance on airport ground personnel and then automatically docked and undocked with the airport docking system. It is contemplated that these operations may also be conducted manually in some situations, as well as by using a combination of automatic and manual operations.

FIG. 3, not drawn to scale, illustrates one embodiment of a method using the system of the present invention at the airport ramp terminal parking area represented in FIG. 2, whereby a single identified electric taxi drive system-driven aircraft 30 may be guided with the on-aircraft monitoring system to drive in a forward direction, automatically dock at a designated airport terminal parking location with extendible passenger loading bridges, park parallel to the airport terminal 52, and connect the extendible passenger loading bridges (54, 56) with the electric taxi drive system-driven aircraft. The electric taxi drive system-driven aircraft is then automatically undocked and automatically guided to move in a forward direction out of the parking location.

In FIG. 3, the arriving aircraft 30 is driven forward through the ramp area with the electric taxi drive systems 32 and guided with the on-aircraft monitoring system to approach the terminal 52 in a nose-in orientation perpendicular to the terminal, and then to rotate or turn 90°. The aircraft 30 is driven forward with the electric taxi drive systems to an assigned parking location 70, where the aircraft 30 will park with the longest axis of the aircraft fuselage parallel to the terminal. This portion of the terminal 52 has four parking locations, each with two passenger loading bridges 54, 56 where an aircraft may dock and connect to the two loading bridges. The parking locations are shown unoccupied for clarity. The aircraft docking and parking maneuvers described will be similar when other aircraft are parked in locations adjacent to the parking location assigned to aircraft 30. These maneuvers will be executed within the space provided by a single parking location. The loading bridges 54, 56 are shown in a retracted position close to the terminal 52 and away from the parking locations to facilitate parking of aircraft parallel to the terminal. When the aircraft 30, guided by the on-aircraft monitoring system while driven with the electric taxi drive systems in a forward direction, has reached a turning location near the terminal 52, the pilot controls the electric taxi drive system, turns the aircraft 90° as shown and described, and continues to drive the aircraft 30 in a forward direction with the electric taxi drive systems to its assigned terminal parking location 70 while being guided by the on-aircraft monitoring system. The identity of the aircraft 30 and the assigned parking location 70 are confirmed by the airport docking system through information communicated to the processor 66 from the receiver 58, and the aircraft may be docked at the parking location 70. Information transmitted and received by the loading bridge transmitters 60 and receivers 62 and by the transmitters and receivers 64 at the aircraft front and rear doors communicated to the processor 66 may activate the automatic controller 68 for the passenger loading bridges 54 and 56 at aircraft 30's assigned parking location 70 to automatically extend the loading bridges and connect with a front door 63a or 63b and a rear door 65a or 65b. Alternatively, once the aircraft is docked at the parking location 70, the passenger loading bridges 54 and 56 may be extended manually, if required, or a combination of automatic and manual operation may be employed to extend the loading bridges and connect them to the aircraft front and rear doors.

When the aircraft 30 is ready for departure, the loading bridges 54 and 56 are automatically or manually disconnected from the aircraft front and rear doors and retracted toward the terminal 52 and away from the aircraft, and the aircraft undocks from the parking location. The pilot activates and controls the electric taxi drive systems 32, activates the on-aircraft monitoring system, and drives the aircraft forward to turn the aircraft 90° so the nose is directed away from the terminal and the aircraft longest axis is perpendicular to the terminal. The departing aircraft 30 is then driven in a forward direction with the electric taxi drive systems and guided through the ramp area and away from the terminal with the on-aircraft monitoring system without reliance on airport ground personnel.

As noted, the aircraft 30 is driven with the electric taxi drive systems in only a forward direction as the aircraft is guided through the ramp area, maneuvered to dock and park at the terminal, and then maneuvered to undock and leave the parking location. This enables the aircraft pilot to continuously keep the aircraft's travel path in view while the aircraft is turning and moving into or out of a terminal parking location. The monitoring and sensor devices in the on-aircraft system described in connection with FIG. 2 expand the pilot's view of the ramp travel area and enhance situational awareness as the pilot maneuvers the aircraft in the forward direction through the ramp and into and out of the parking location 70. The pilot is also guided by information from the monitoring and sensing devices and should not need to rely on intervention or control by airport ground personnel as the aircraft is driven with the electric taxi drive systems.

As the aircraft 30 approaches the terminal 52, input from the monitoring and sensor devices in the on-aircraft system may alert the pilot when the aircraft should be turned, and the aircraft may be turned manually, or the electric taxi drive system and aircraft steering system may be programmed to turn the aircraft 90° automatically at a programmed distance from the terminal. Additional receivers 58 may be programmed to begin identification of the aircraft 30 as the aircraft 30 passes these receivers while the electric taxi drive systems drive it forward to the assigned parking location 70, and the receiver 58 at the assigned parking location 70 may confirm the identity of the aircraft when it arrives.

The receivers 60 and transmitters 62 on the passenger loading bridges 54 and 56 may also communicate with the receivers and transmitters 64 at the aircraft front and rear doors (FIG. 2) to confirm identity of the aircraft and dock the aircraft parallel to the terminal 52 at the parking location. The loading bridges 54, 56 are automatically extended in response to the automatic controller 68 to connect with corresponding front and rear aircraft doors, and passenger and cargo transfer may commence. As noted, when the aircraft is parked parallel to the terminal, the loading bridges 54 and 56 may be oriented substantially perpendicularly between the aircraft and the terminal and substantially parallel to each other.

Following clearance of the aircraft for departure, the docking system may operate to automatically disconnect the loading bridges 54 and 56 from the aircraft front and rear doors, retract the loading bridges toward the terminal 52, and undock the aircraft 30. The pilot then activates the electric taxi drive systems 32 and the on-aircraft monitoring system, if this is required, turns the aircraft 90°, and drives the aircraft 30 in a forward direction away from the parking location 70 and through the ramp area. The on-aircraft processor 50 guides the aircraft's electric taxi drive system-driven ground travel away from the parking location with input from the monitoring and sensor devices in the on-aircraft monitoring system. This enables the pilot to drive the aircraft with the electric taxi drive systems and to control ground travel away from the parking location and through the ramp area without reliance on airport ground personnel.

As previously noted, aircraft parking locations at airport terminals are currently configured to support aircraft parked in a nose-in orientation substantially perpendicular to an airport terminal and have a single passenger loading bridge that is typically connected to an aircraft forward door. FIGS. 4A-4H illustrate another embodiment of the system and method of the present invention at an airport with different configurations and numbers of passenger loading bridges at parking locations than at the airports shown in FIGS. 1, 2, and 3. This includes passenger loading bridges positioned to connect with aircraft parked in an orientation perpendicular to the terminal. In this embodiment, an electric taxi drive system-driven aircraft is automatically guided through the ramp area and docked and parked parallel to the terminal in a parking location 85 with two extendible passenger loading bridges between terminal parking locations that have single passenger loading bridges to connect with aircraft parked nose-in and perpendicular to the terminal.

Figure 4A:
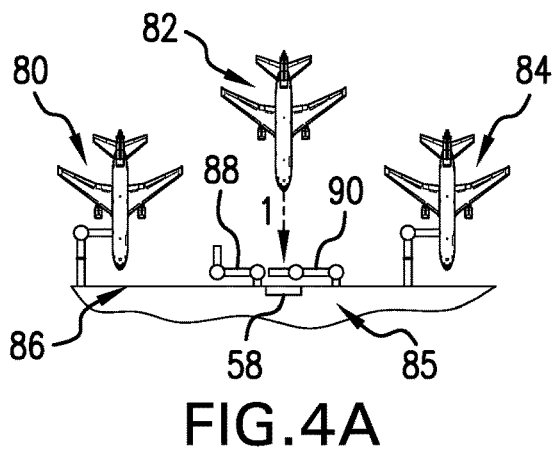
FIGS. 4A-4H illustrate a second embodiment of the system and method of the present invention at an airport with different configurations and numbers of passenger loading bridges at parking locations than in FIG. 3 and aircraft parked in both parallel and nose-in orientations.
Figure 4B:
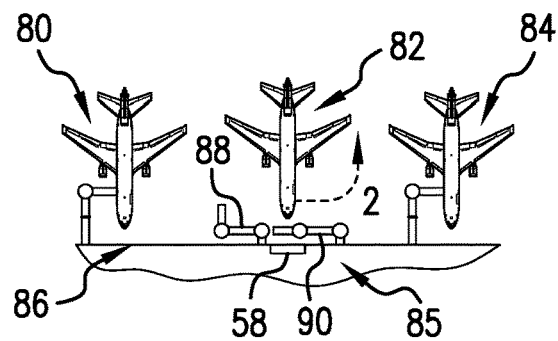
Figure 4C:
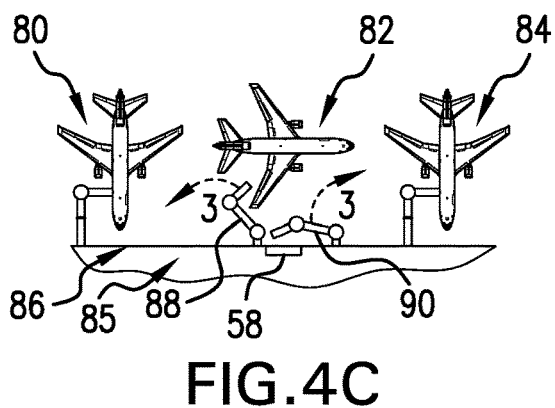

Aircraft 80 and 84 are parked at passenger loading bridges 86 and 92, respectively, in a nose-in orientation with the longest axis perpendicular to an airport terminal 86. It is contemplated that the terminal 86 will have a receiver 58 (not shown) at parking location 85 and the capability to identify the aircraft 82 as that assigned to parking location 85. Extendible passenger loading bridges 88 and 90 are shown at parking location 85 retracted adjacent to the terminal 86. Operation of the passenger loading bridges 88 and 90 to extend, connect with the aircraft 82, and then retract or to move in other ways may be fully automated in response to activation of an automatic controller 68 as described above and may have manual overrides. In FIGS. 4A and 4B, aircraft 82 has been identified as assigned to parking location 85 and is being guided by the on-aircraft monitoring system and the automatic parking and docking system along the path shown by arrow 1 with its nose end directed toward the terminal building 86. As aircraft 82 approaches the terminal building 86, the pilot may begin to turn the aircraft, or the aircraft may be turned automatically, in the direction of arrow 2. As shown in FIG. 4C, the aircraft 82 has turned along the path of arrow 2 so that the aircraft nose has turned 90° away from the terminal 86 and the longest axis of the aircraft 82 is positioned parallel to the terminal.

Figure 4D:
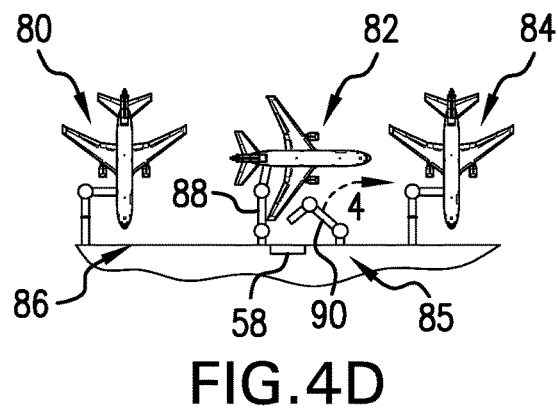
Figure 4E:
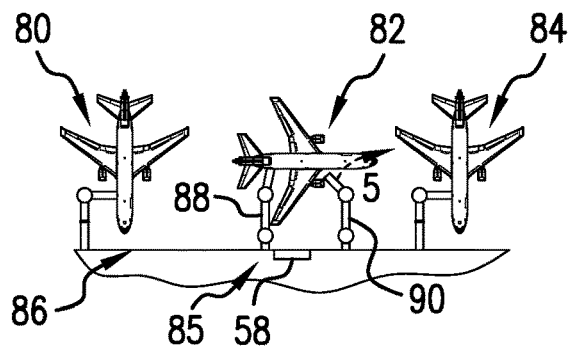
Figure 4F:
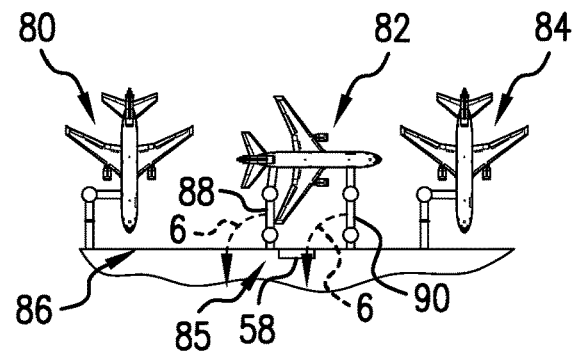
Figure 4G:
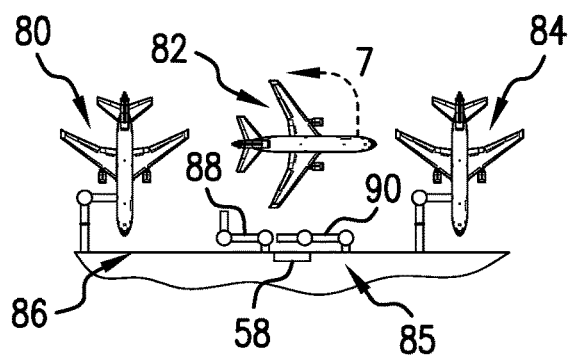

The passenger loading bridges 88 and 90 may be automatically extended, such as along the paths indicated by respective arrows 3, 4, and 5 in FIGS. 4C, 4D, and 4E. This type of extendible passenger loading bridge may differ from that shown in FIGS. 1, 2, and 3 and may be more useful for the airport parking arrangement shown in FIG. 4. As discussed above, the two passenger loading bridges 88 and 90 should be located at the terminal building 86 and spaced to permit a passenger loading bridge to be connected to a front door and to a rear door of the aircraft 82 assigned to the parking location 85 when the loading bridges are fully extended, as shown in FIG. 4F. A receiver 58 is located on or near the terminal at the parking location 85, and each passenger loading bridge 88 and 90 has receivers 60 and transmitters 62, and all of the receivers and transmitters are in communication with the processor 66, as shown and described above in connection with FIG. 2. The aircraft 82, which is driven by electric taxi drive systems, is also configured with the on-aircraft monitoring and sensor devices and cockpit controls and processor described above in connection with FIGS. 2 and 3 and the sensors, receivers, and transmitter 64 associated with each aircraft front and rear door on both sides of the aircraft.

Figure 4H:
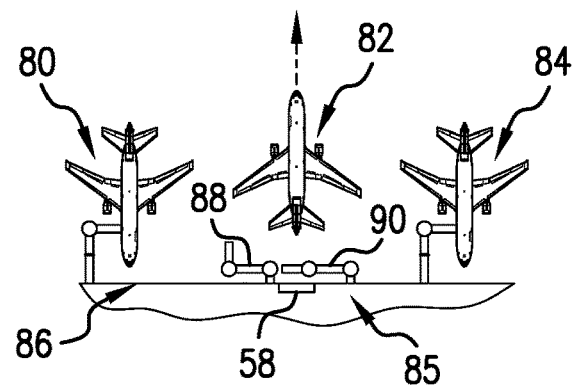

When all passengers and crew have boarded aircraft 82 and it is ready for departure, the passenger loading bridges 88 and 90 may be automatically or manually moved away from the aircraft, such as along the paths indicated by arrows 6 in FIG. 4F. The passenger loading bridges 88 and 90 may assume the positions shown in FIGS. 4G and 4H so that they are as close to the terminal 86 as possible or are otherwise moved out of the space required for aircraft 82 to turn from its position parallel to the terminal 86 along the path indicated by arrow 7 in FIG. 4G. As indicated, the drawings are not to scale, and it is contemplated that the terminal parking locations, such as parking location 85, that have two passenger loading bridges adjacent to parking locations with a single passenger loading bridge to accommodate aircraft parked nose-in to the terminal, will have sufficient clearance for the described turning maneuvers. FIG. 4H illustrates aircraft 82 after it has been turned 90° from its parallel orientation with the electric taxi drive systems so that the aircraft's nose end is pointing away from the terminal building 86 and is ready to continue being driven in a forward direction and guided without reliance on airport ground personnel through the ramp area as described above.

While the present invention has been described with respect to preferred embodiments, this is not intended to be limiting, and other arrangements and structures that perform the required functions are contemplated to be within the scope of the present invention.

INDUSTRIAL APPLICABILITY

The aircraft parking system and method of the present invention will have its primary applicability at airport terminals where multiple passenger loading bridges currently exist at parking locations or may be installed at terminal parking locations to provide connections to at least one aircraft forward door and one aircraft rear door and electric taxi drive system-driven aircraft may be guided to automatically dock and undock at the airport terminal parking locations where the electric taxi drive system-driven aircraft are parked in orientations with the aircraft fuselage longest axis parallel to the terminal, and passenger loading bridges may be automatically connected to and disconnected from the aircraft forward and rear doors.

The invention claimed is:

1. A method that automatically integrates docking and parking pilot-controllable taxi drive system-driven aircraft and guides the pilot-controllable taxi system-driven aircraft into and out of designated airport terminal parking locations to dock and park in an orientation parallel to the airport terminal without reliance on airport ground personnel, comprising:
   a. at an airport terminal with a plurality of aircraft parking locations, providing an aircraft parking location receiving device and multiple extendible passenger loading bridges at each parking location, the multiple passenger loading bridges being spaced and positioned to connect with corresponding multiple forward and rear doors of each aircraft parked at a parking location with a longest axis of the aircraft oriented parallel to the airport terminal, and providing a loading bridge receiving and transmitting device mounted on each said extendible passenger loading bridge;
   b. equipping aircraft with landing gear wheel-mounted pilot-controllable taxi drive systems, providing pilot-controllable taxi drive system cockpit controls to maneuver the equipped aircraft into the parallel parking orientations, an on-aircraft monitoring system comprising ground travel monitoring and sensing devices mounted in exterior locations on the equipped aircraft to obtain and communicate real time aircraft ground travel information to cockpit indicators, an on-aircraft processor in real time communication with the on-aircraft monitoring system, the cockpit controls and indicators, and the pilot-controllable taxi drive systems, and aircraft door receiving and transmitting devices located at each forward door and rear door on opposite sides of the equipped aircraft, further providing an airport terminal docking and parking system with a docking and parking processor in integrating real time communication with the on-aircraft processor, the aircraft parking location receiving devices, the loading bridge receiving and transmitting devices, and the aircraft door receiving and transmitting devices, and assigning each equipped aircraft to dock at a designated one of the plurality of airport terminal parking locations;
   c. programming the docking and parking processor to integrate real time communications from the on-aircraft processor, the aircraft parking location receiving devices, the loading bridge receiving and transmitting devices, and the aircraft door receiving and transmitting devices to automatically identify an equipped aircraft assigned to dock at a designated parking location, to guide said identified equipped aircraft to dock and park in the parallel orientation at the designated parking location, and connect the multiple extendible passenger loading bridges to corresponding multiple forward and rear doors on an airport terminal-facing side of the identified equipped aircraft;
   d. driving an equipped aircraft with the pilot-controllable taxi drive systems and cockpit controls and the on-aircraft monitoring system assisting a pilot to maneuver the equipped aircraft through an airport ramp area to the assigned airport terminal parking location, while the on-aircraft processor receives, integrates, and transmits real time information from the on-aircraft monitoring system and the pilot-controllable taxi drive system to the cockpit; and
   e. identifying the equipped aircraft as assigned to dock at the designated airport terminal parking location with real time information transmitted to the aircraft parking location receiving device, guiding the identified equipped aircraft to maneuver into the parallel parking orientation with the pilot-controllable taxi drive systems, communicating real time position information for the identified equipped aircraft to the loading bridge receiving and transmitting devices and the aircraft door receiving and transmitting devices, and connecting each of the multiple passenger loading bridges to each corresponding forward aircraft door and rear aircraft door.

2. The method of claim 1, further comprising providing intelligent algorithms for use by the docking and parking processor and providing docking and parking system receiver and transmitter components in the aircraft door receiving and transmitting devices on each of the multiple forward and rear doors of the aircraft and in the loading bridge receiving and transmitting devices on each of the multiple passenger loading bridges, obtaining and transmitting to the docking and parking processor identifying information required to connect each of the multiple passenger loading bridges to a corresponding one of the multiple aircraft forward and rear doors, and connecting each of the multiple passenger loading bridges to a corresponding one of the multiple aircraft forward and rear doors.

3. The method of claim 2, further comprising automatically extending each of the multiple passenger loading bridges and automatically connecting each of the multiple passenger loading bridges to a corresponding one of the multiple aircraft forward and rear doors.

4. The method of claim 1, wherein the multiple passenger loading bridges comprise two passenger loading bridges and the multiple aircraft forward and rear doors comprise one forward door and one rear door on each side of the aircraft, and the docking system receiver and transmitter components are located on the two passenger loading bridges and on the forward door and on the rear door on both sides of the aircraft in control communication with the docking and parking processor, and automatically docking one of the two passenger loading bridges to connect to one forward door and automatically docking another of the two passenger loading bridges to connect to one rear door on the airport terminal-facing side of the aircraft.

5. The method of claim 3, further comprising automatically undocking and retracting each of the multiple passenger loading bridges from the corresponding one of the multiple aircraft forward and rear aircraft doors, guiding the equipped aircraft with the on-aircraft monitoring system, and driving the aircraft with the electric taxi drive system in a forward direction out of the assigned parking location.

6. The method of claim 5, further comprising providing intelligent algorithms for use by the on-aircraft processor for automatic real time operation of the on-aircraft monitoring system and guidance of the docking and parking system at each of the plurality of parking locations with the multiple passenger loading bridges, guiding ground movement of the pilot-controllable taxi drive system-driven aircraft in a forward direction into and out of an assigned one of the plurality of parking locations in response to real time information from the on-aircraft monitoring system, and automatically extending and retracting the multiple passenger loading bridges at the assigned parking location to corresponding aircraft multiple front and rear doors to dock and undock the aircraft from the assigned one of the plurality of parking locations.

7. The method of claim 6, further comprising providing a receiver in communication with the docking and parking processor to receive real time information from each equipped aircraft assigned to each of the plurality of parking locations and receiving real time information comprising at least identity of the aircraft, position of the aircraft relative to the terminal and the assigned parking location, and forward and rear doors to be connected to identified ones of the multiple passenger loading bridges.

8. The method of claim 7, further comprising using the real time ground travel environment information communicated by the on-aircraft monitoring system to the on-aircraft processor and guiding the aircraft to drive forward into and out of the assigned parking location without reliance on assistance from ground personnel.

9. The method of claim 8, further comprising equipping the aircraft with landing gear wheel-mounted pilot-controllable electric taxi drive systems and providing pilot-controllable electric taxi drive system cockpit controls to maneuver the equipped aircraft.

10. A system that automatically integrates docking and parking pilot-controllable taxi drive system-driven aircraft and guides the pilot-controllable taxi system-driven aircraft into and out of designated airport terminal parking locations to dock and park in an orientation parallel to the airport terminal without reliance on airport ground personnel, comprising:
  a. an airport terminal with a plurality of aircraft parking locations, multiple extendible passenger loading bridges spaced and positioned at each of said plurality of parking locations to connect with corresponding multiple forward and rear doors of aircraft parked at each parking location with a longest axis of said aircraft oriented parallel to said airport terminal, wherein each parking location has an aircraft parking location receiving device and a loading bridge receiving and transmitting device is mounted on each said extendible passenger loading bridge;
  b. aircraft equipped with landing gear wheel-mounted pilot-controllable taxi drive systems and pilot-controllable taxi drive system cockpit controls controllable to maneuver said equipped aircraft into said parallel parking orientations at designated assigned airport terminal parking locations, said aircraft being further equipped with an on-aircraft monitoring system comprising ground travel monitoring and sensing devices mounted in exterior locations on said equipped aircraft to obtain and communicate real time aircraft ground travel information to cockpit indicators, an on-aircraft processor in real time communication with said on-aircraft monitoring system, said cockpit controls and indicators, and said pilot-controllable taxi drive systems, and aircraft door receiving and transmitting devices located at each forward door and rear door on opposite sides of said equipped aircraft;
  c. an airport terminal docking and parking system with a docking and parking processor in integrative real time communication with said on-aircraft processor, said aircraft parking location receiving devices, said loading bridge receiving and transmitting devices, and said aircraft door receiving and transmitting devices, said docking and parking processor being programmed to integrate real time communications from said on-aircraft processor, said aircraft parking location receiving devices, said loading bridge receiving and transmitting devices, and said aircraft door receiving and transmitting devices, to automatically identify an equipped aircraft assigned to dock at a designated parking location, and to guide said identified equipped aircraft to dock and park in the parallel orientation at said designated parking location with said multiple extendible passenger loading bridges forming connections to corresponding multiple forward and rear doors on an airport terminal-facing side of said identified equipped aircraft; and
  d. said cockpit controls and said on-aircraft monitoring system being operative to assist a pilot to maneuver said identified equipped aircraft with said pilot-controllable taxi drive systems to said assigned parking in response to integrated real time information transmitted from said on-aircraft processor to said cockpit, said aircraft parking location receiving device being operative to identify each said equipped aircraft as assigned to dock at said parking location, and said loading bridge receiving and transmitting devices and said aircraft door receiving and transmitting devices being operative to connect each of said multiple passenger loading bridges to each corresponding forward aircraft door and rear aircraft door when said identified equipped aircraft is parked in said parallel parking orientation.

11. The system of claim 10, further comprising intelligent algorithms in said docking and parking processor and docking and parking system receiver and transmitter components in said aircraft door receiving and transmitting devices on each of the multiple forward and rear doors of the aircraft and in the loading bridge receiving and transmitting devices on each of the multiple passenger loading bridges, wherein said docking and parking processor is in integrative real time communication with said parking system receiver and transmitter components to identify information required to connect each of said multiple passenger loading bridges to a corresponding one of said multiple aircraft forward and rear doors.

12. The system according to claim 11, further comprising automatic controllers for extending and retracting each of said multiple passenger loading bridges in real time communication with said docking and parking processor.

13. The system according to claim 10, wherein said multiple extendible passenger loading bridges are manually extendible or are automatically extendible to connect with said corresponding ones of said multiple aircraft forward and rear doors.

14. The system according to claim 11, wherein said pilot-controllable taxi drive systems comprise electric taxi drive systems with pilot-controllable electric taxi drive system cockpit controls to maneuver said equipped aircraft.

15. The system according to claim 11, wherein said on-aircraft processor is in integrative real time communication with said on-aircraft monitoring system and said electric taxi drive system to guide ground travel of said equipped aircraft into and out of said parallel parking orientation at said designated parking location.

* * * * *